UNITED STATES PATENT OFFICE.

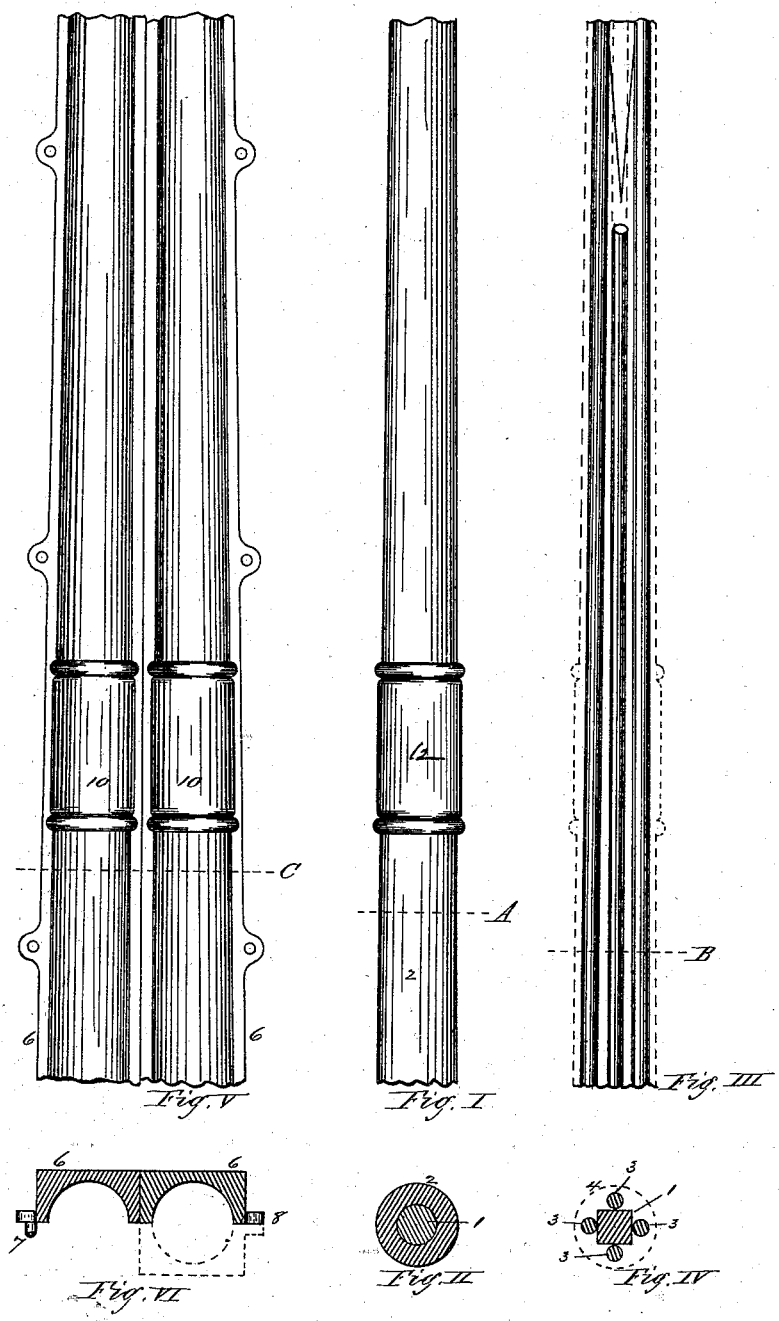

VINAL B. BARSTOW AND BENJAMIN BARSTOW, OF WESTFIELD, MASS.

WHIP.

SPECIFICATION forming part of Letters Patent No. 263,098, dated August 22, 1882.

Application filed January 16, 1882. (No model.)

*To all whom it may concern:*

Be it known that we, VINAL B. BARSTOW and BENJAMIN BARSTOW, both of Westfield, in the county of Hampden and State of Massachusetts, have invented a new and useful Improvement in Whips, of which the following is a specification and description.

The object of our invention is to provide a cheap and durable whip by building a plastic material upon and around a central elastic core, and we accomplish this substantially in the manner and by the means as hereinafter described and illustrated in the accompanying drawings, in which—

Figure I is a side view of a portion of a whip formed up according to our invention. Fig. II is a transverse section of the same at line A of Fig. I. Fig. III is a side view of a portion of a whip-core strengthened by longitudinal cords before the plastic material is added. Fig. IV is a transverse section of the same at line B. Fig. V is a plan view, showing the two parts of a mold, inside, which we use in forming up the whip-body; and Fig. VI is a transverse section of the same at line C of Fig. V.

In the drawings, 1 represents the core, which may be of any desired elastic material and of any desired form in cross-section and of the usual taper from butt to tip, the form and taper of these whip-cores being of course well known.

6 represents a mold, made preferably in two halves or parts, and when these parts are placed together the cavity within will be of the same form as the exterior of the whip when finished and of the same taper. Instead of being the same length as the whip core, however, we may make the molds in sections— say of two or more lengths—to form the entire whip, or for that part of the whip-core upon which it is designed to build the plastic material—say one section or length for the larger part of the whip near and at the butt and another section or length for the smaller portion—both sections of the molds being of such taper inside as that the whip, when formed therein, shall be of a uniform taper from the butt to the point.

The material we prefer to use in forming up the whip is flocking, or the shearings of cloth, mixed with glue or any similar substance which will give the desired consistency and plastic character while being worked and the desired elasticity to the body of the whip when dry. In preparing this material we take, say, one quart of water, and add thereto, say, one-half pound of glue, or mix the two in suitable proportions for the ordinary purposes for which glue is used in gluing wood, heating it to dissolve the glue thoroughly. We then add the flocking in proportions of, say, one-half pound of flocking to the above proportions of glue and water, or, more flocking, if required, so that the mixture may be of the consistency of a thick tenacious springy paste. The parts of the mold may be then doweled together, and the core, as 1, located and held in the mold, as shown in dotted lines in Fig. VI, with the axis of the core coincident with that of the mold, by suitable guides or in any convenient manner, and the mixture is then forced into the mold at the end, completely filling it and inclosing the core. Before the parts of the mold are placed together they should be greased on the interior surface, so that when the whip is formed it may not adhere to the inside of the mold, and when removed from the mold the whip-body thus formed is set aside to dry and harden. Any desired finish may be given the body after becoming hard and dry—as, for example, the exterior surface may be smoothed and covered with any water-proof preparation— as a solution of shellac, which may be colored to give the appearance of wood of any particular kind; or, the body of the whip may be prepared with the waterproofing and then platted with a textile fabric in the usual manner; or, it may be platted first and the waterproof preparation applied afterward, if desired. In fact, the body of the whip, when once formed of this elastic plastic material in molds, as above described, may be finished as to its appearance in a great variety of ways.

The advantages of this invention are manifestly great over the ordinary methods of construction now practiced. All the better class of whips now manufactured are built up by fitting sidings of rattan to the core and filling up all the uneven places with chink pieces of the same material, the first of which, even in rough stock, is much more than the whole cost of a whip made according to our invention, and these pieces require to be all nicely fitted and glued in place, and after they are sufficiently dry the whole must be turned to a smooth and true taper by a machine for that purpose, after which it is finished; whereas in our construction, no machine-work is required, and the whip is ready for its final exterior finish when it is taken from the mold. These molds may be cast of metal, or they may be made of any desired material, and may have the ordinary buttons or ferrules or any other desired ornamentation made therein, as shown at 10 in Fig. V, so that when the whip-body is removed from the mold the desired form of the ornamentation will be all made thereon, as shown at 12 in Fig. I, and these ornamented portions may be separately treated from the remaining portion of the body as to exterior finish. For example, the ferrule portion, as 12, may be platted with textile material and the rest of the whip finished in imitation of wood, and vice-versa. The body of a whip thus formed possesses all the necessary requirements for a good durable whip—such as toughness and elasticity.

In order to give additional strength to the whip-body we may, if desired, stretch cords, as 3, longitudinally along the core and secure the ends thereto before placing the core in the molds, as shown clearly in Figs. III and IV, the dotted line representing the exterior of the plastic material when formed.

Having thus described our invention, what we claim as new, is—

1. An improved whip-body, consisting of a central elastic core combined and covered with an elastic dried plastic compound, substantially as described.

2. An improved whip-body, consisting of a central elastic core combined and covered with an elastic dried plastic compound, and whose exterior ornamentation is integral with said whip-body, substantially as described.

VINAL B. BARSTOW.
BENJAMIN BARSTOW.

Witnesses:
 T. A. CURTIS,
 CHAS. H. WOOD.